US008654780B2

(12) United States Patent
On et al.

(10) Patent No.: US 8,654,780 B2
(45) Date of Patent: Feb. 18, 2014

(54) SYSTEM AND METHOD OF COMMUNICATION PROTOCOLS IN COMMUNICATION SYSTEMS

(75) Inventors: Hanson On, Escondido, CA (US); Yan Hui, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 0 days.

(21) Appl. No.: 13/433,566

(22) Filed: Mar. 29, 2012

(65) Prior Publication Data
US 2012/0243548 A1    Sep. 27, 2012

Related U.S. Application Data

(63) Continuation of application No. 12/428,245, filed on Apr. 22, 2009, now Pat. No. 8,170,043.

(60) Provisional application No. 61/047,050, filed on Apr. 22, 2008.

(51) Int. Cl.
*H04L 12/28* (2006.01)
*H04L 12/56* (2011.01)
*H04B 7/00* (2006.01)
*H04W 4/00* (2009.01)

(52) U.S. Cl.
USPC ............................. 370/419; 370/310; 370/328

(58) Field of Classification Search
USPC .......................................... 370/310, 328, 419
See application file for complete search history.

(56) References Cited

U.S. PATENT DOCUMENTS

| 6,067,407 | A | * | 5/2000 | Wadsworth et al. | 709/224 |
|---|---|---|---|---|---|
| 6,839,346 | B1 | * | 1/2005 | Kametani | 370/389 |
| 6,868,072 | B1 | * | 3/2005 | Lin et al. | 370/276 |
| 8,004,961 | B1 | * | 8/2011 | Buchanan et al. | 370/216 |
| 2003/0031191 | A1 | * | 2/2003 | El Wardani et al. | 370/401 |
| 2003/0206535 | A1 | * | 11/2003 | Shpak | 370/328 |
| 2004/0252641 | A1 | * | 12/2004 | Bagchi et al. | 370/230 |
| 2005/0008160 | A1 | * | 1/2005 | Izawa et al. | 380/270 |
| 2005/0232271 | A1 | * | 10/2005 | Kettunen et al. | 370/390 |
| 2005/0243756 | A1 | * | 11/2005 | Cleveland et al. | 370/328 |
| 2006/0092864 | A1 | * | 5/2006 | Gupta et al. | 370/278 |
| 2006/0164981 | A1 | * | 7/2006 | Olsson et al. | 370/229 |
| 2006/0221998 | A1 | * | 10/2006 | Livet et al. | 370/464 |
| 2006/0223450 | A1 | * | 10/2006 | Dacosta | 455/73 |
| 2007/0070896 | A1 | * | 3/2007 | Alapuranen et al. | 370/230 |
| 2008/0052533 | A1 | * | 2/2008 | Iida et al. | 713/189 |
| 2008/0194201 | A1 | * | 8/2008 | Sinivaara et al. | 455/41.2 |

* cited by examiner

Primary Examiner — Ronald Abelson
(74) Attorney, Agent, or Firm — Van Pelt, Yi & James LLP

(57) ABSTRACT

Systems and methods for implementing and designing protocols in such communications systems which can be wireless or wired. The systems and methods can include fundamental changes in the traditional protocol design approaches with their constraints of one-to-one mapping in protocols. By doing so, embodiments of the present invention enable an efficient way to design and implement a system to support single or multiple protocols.

6 Claims, 7 Drawing Sheets

SYSTEM AND METHOD OF COMMUNICATION PROTOCOLS IN COMMUNICATION SYSTEMS

RELATED APPLICATION

This application is a continuation of co-pending U.S. patent application Ser. No. 12/428,245, entitled SYSTEM AND METHOD OF COMMUNICATION PROTOCOLS IN COMMUNICATION SYSTEMS filed Apr. 22, 2009 which is incorporated herein by reference for all purposes, which claims priority to U.S. Provisional Application No. 61/047, 050, entitled METHOD OF DESIGN COMMUNICATION PROTOCOLS IN COMMUNICATION SYSTEMS filed Apr. 22, 2008 which is incorporated herein by reference for all purposes.

RELATED ART

In many communication systems, a device that supports one communication standard, or air interface in the case of wireless communications, (we refer to as "single mode" hereafter) consists of one set of communication protocol layers. For example, one set of communication protocol layers can include one physical layer (PHY) 110, one data link layer 120 (including a logical link control sublayer or module and a media access control (MAC) sublayer or module), one network layer 130, one transport layer 140, and one or more applications represented by block 150, as shown in FIG. 1. The PHY or PHY module of the communication device converts the data of interest into a physical signal which it then transmits. The data link layer or module is responsible for functions relating to transferring data between adjacent network nodes in a network. The logical link control sublayer provides multiplexing and flow control mechanisms. The MAC sublayer provides addressing and channel access control that permit several devices to communicate within a multipoint network. The network layer or module is responsible for end to end (source to destination) packet delivery, including routing. This layer can implement the functional and procedural means of transferring variable length data sequences from a source to a destination via one or more networks while maintaining the quality of service and error control functions.

The traditional design for such devices maps each layer to another layer one to one. For example, the data layer link is one to one mapped to one PHY layer. The lower layer provides services (e.g. protocol data units transmission and reception) to its upper layer by implementing a service access point (SAP). This is also illustrated in FIG. 1.

As an example, FIG. 2 illustrates a universal mobile telecommunications system (UMTS) user plane protocol as peers. FIG. 2 shows the protocol stacks of the user equipment (UE) 210 and the user equipment base station (Node B) 220.

A device that supports more than one communication standard or air interfaces (we refer to as "multi-mode" hereafter) usually consists of multiple sets of protocol layers. Each of the protocol layer stacks is operated independently from the other protocol stacks. Each of the layers in each of the protocol stacks are also one to one mapped, similar to the single mode case. This is illustrated in FIG. 3 which depicts three communication devices 310, 320 and 330. Devices 310 and 330 are single mode devices and device 320 is a multi-mode device.

The above approaches do not address the following issues, especially for multi-mode devices:
1. Flexibility to support different configurations of single or multi-mode;
2. Re-configurability using the same protocol software or hardware;
3. Potential savings in implementation via re-use among different protocols;
4. Ease of adding new standards by decoupling the different layers as well as hardware and software implementation; and
5. Efficiency in managing different standards to reduce or avoid interference in radio frequency (RF) frequencies.

There have been some efforts to coordinate between two independently operated protocols in order to support multi-mode as required by certain standards such as dual-mode GSM and UMTS. A typical implementation is shown in FIG. 4. In FIG. 4 a dual mode UE 410 and a base station (Node B) are depicted with the communication between the layers of their two protocol stacks depicted diagrammatically. However, such implementations are usually still a one to one mapping of the signaling layers to PHY. Additionally, such configurations still do not address most of the issues stated above.

There also have been some efforts relating to coordinating between two independently operated protocols in order to overcome problems such as interference between two standards operating on the same frequency or frequencies close to each other. A typical implementation is shown in FIG. 5 where a communication device 510 having two independently operated protocols stacks 520 and 530 is depicted with coordination between the stacks being depicted diagrammatically. The implementation still uses independently operated protocols with one to one mapping within each mode. Therefore, they cannot address most of the issues stated above.

SUMMARY

Embodiments described herein provide for communication devices, systems and methods wherein more than one communication protocol is implemented and all of the layers of the protocol stack are not mapped one to one.

In one aspect a multimode communication device includes a first network layer configured to route data between nodes on a network according to a first network layer protocol. A first data link layer is in communication with the first network layer and transmits data to and from the first network layer and routs said data between adjacent nodes on the network according to a first data link layer protocol. A second network layer is configured to route data between nodes on the network according to a second network layer protocol. A second data link layer is in communication with the second network layer and transmits data to and from the second network layer and routes said data between adjacent nodes on the network according to a second data link layer protocol. Additionally, a physical layer is configured to transform data received from the first data link layer into signals for transmission and transmit the signals, to transform data received from the second data link layer into signals for transmission and transmit the signals, to receive signals from the network, convert the received signals into data and identify whether the data should be provided to the first data link layer or the second data link layer.

In a further aspect the physical layer includes a first service access point for communicating with the first data link layer and a second service access point for communicating with the second data link layer; wherein the first service access point and the second service access point coordinate access the resources of the physical layer between the first data link layer and the second data link layer.

In another aspect a multimode communication device includes a network layer to route data between nodes on a network according to a network layer protocol. A data link layer is in communication with the network layer, transmits data to and from the first network layer and routes said data between adjacent nodes on the network according to a first data link layer protocol. a first physical layer is configured to transform data received from the data link layer into signals for transmission according to a first physical layer protocol, to receive signals from the first network connection and convert the received signals into data, and to provide the data from the received signals to the data link layer. A second physical layer is configured to transform data received from the data link layer into signals for transmission according to a second physical layer protocol, to receive signals from the second network connection and convert the received signals into data, and to provide the data from the received signals to the data link layer.

In a further aspect the first physical layer further includes a first service access point for communicating with the first data link layer and the second physical layer further comprises a second service access point for communicating with the data link layer; wherein the first service access point and the second service access point coordinate access the resources of the physical layer between the first data link layer and the second data link layer.

In a further aspect a multimode communication device includes a first network layer configured to route data between nodes on a network according to a first network layer protocol. A first logical link control layer is in communication with the first network layer for transmitting data to and from the first network layer and providing data flow control. A second network layer is configured to route data between nodes on the network according to a second network layer protocol. A second logical link control layer is in communication with the first network layer and transmits data to and from the first network layer and provides data flow control. A media access control layer provides channel access control and transmits data to and from the first logical link control layer and the second logical link control layer. A physical layer is configured to transform data received from the media access control layer into signals for transmission and transmit the signals, to receive signals from the network, convert the received signals into data and provide the data to the media access control layer.

In a further aspect the media access control layer comprises a first service access point for communicating with the first logical link control layer and a second service access point for communicating with the second logical link control layer; wherein the first service access point and the second service access point coordinate access the resources of the media access control layer between the first logical link control layer and the second logical link control layer.

In a another aspect a multiple physical layer communication system includes a network layer providing a communication interface to at least one application; a data link layer in communication with the first network layer and transmitting data to and from the first network layer and routing said data between adjacent nodes on the network according to a data link layer protocol. An entity management module includes a network unified application program interface (Network UAPI) to provide communication between the network layer and the data link layer, a data link layer unified application program interface (DLL UAPI) providing communication between the data link layer and a first physical layer and a second physical layer and wherein, the entity management module configured to request an amount of network data from network layer via the Network UAPI according to the needs of the first and second physical layers, deliver data received from the network layer to the data link layer through the plurality of input/output ports of the data link layer, deliver data received from the plurality of input/output ports of the data link layer to the first physical layer and the second physical layer via the DLL UAPI, receive data from the first physical layer and the second physical layer deliver the received data to the data link layer, deliver data received from the to the network layer via the Network UAPI.

In another aspect a multiple data link layer communication system includes a network layer providing a communication interface to at least one application; a first data link layer in communication with the network layer and transmitting data to and from the network layer and routing said data between adjacent nodes on the network according to a first data link layer protocol; a second data link layer in communication with the network layer and transmitting data to and from the network layer and routing said data between adjacent nodes on the network according to a second data link layer protocol; an entity management module comprising a network unified application program interface (Network UAPI) to provide communication between the network layer and the first data link layer and to provide communication between the network layer and the second data link layer, a physical layer unified application program interface (PHY UAPI) providing communication between the first data link layer and a physical layer and the second data link layer and the physical layer. The entity management module is configured to determine which data link layer to deliver data received from the network layer and deliver it, deliver data received from the first data link layer and the second data link layer to the physical layer via the PHY UAPI, receive data from the physical layer, determine which data link layer it should be delivered to and deliver.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. The following description sets forth numerous specific details, such as examples of specific systems, components and methods in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Particular implementations may vary from these exemplary details and still be contemplated to be within the spirit and scope of the present invention.

Rapid developments in communication systems, especially wireless communication systems, have lead to the situation where a large number of systems with different protocols have to co-exist and to communicate with each other efficiently. Embodiments of the invention described herein include systems and methods for implementing and designing protocols in such communications systems which can be wireless or wired. The systems and methods can include fundamental changes in the traditional protocol design approaches with their constraints of one-to-one mapping in protocols. By doing so, embodiments of the present invention enable an efficient way to design and implement a system to support single or multiple protocols.

Each of the embodiments described herein can be implemented as a wired or wireless communication device such as an access point, a base station, a mobile device, or other communication device. Each such communication device includes the standard components or elements of such a device as is known to those of ordinary skill in the art and which therefore are described in detail herein. In the example of a wireless communication device, such elements can include an antenna or antenna system coupled to the up converter or analog portion of a modem which is coupled to the baseband portion of the modem which is coupled to the described PHYs. Those elements can transmit the digital information from the PHY as a radio wave or signal. The combination of the PHY, the baseband portion and the analog portion are generally referred to as the modem. In most embodiments the communication systems described below operate in the same manner as those described above except as noted.

Figure 1:
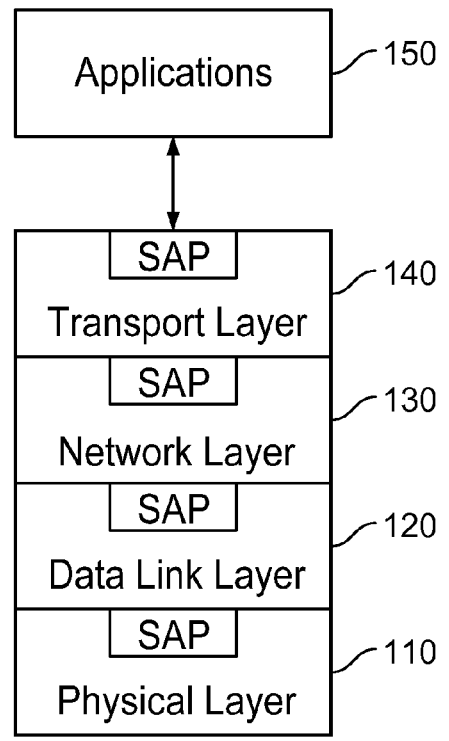
FIG. 1 is a block diagram of a protocol stack in a communication device.
Figure 2:
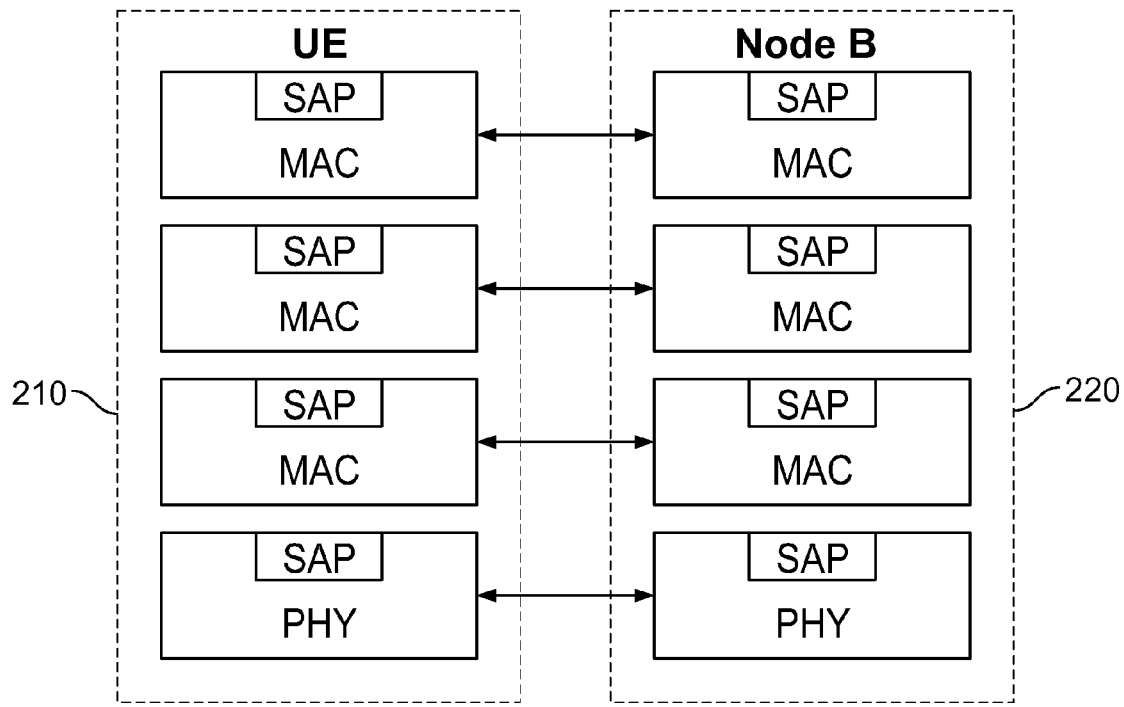
FIG. 2 is a block diagram of the user plane protocols of the user equipment (UE) and a base station (Node B) in a universal mobile telecommunications system (UMTS).
Figure 3:
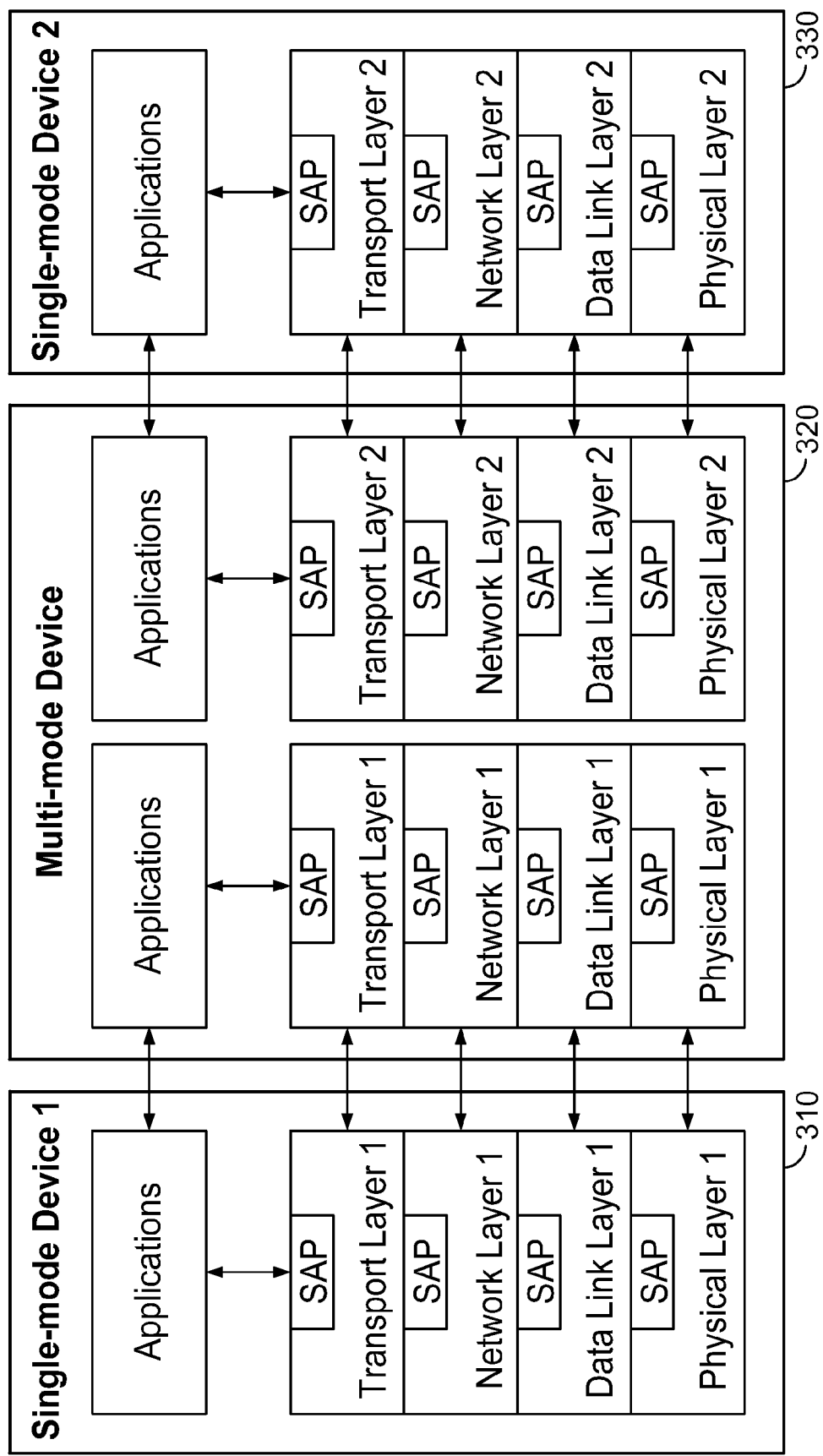
FIG. 3 is a block diagram of an implementation of protocol stacks in a multi-mode communication system with the multi-mode device in the middle.
Figure 4:
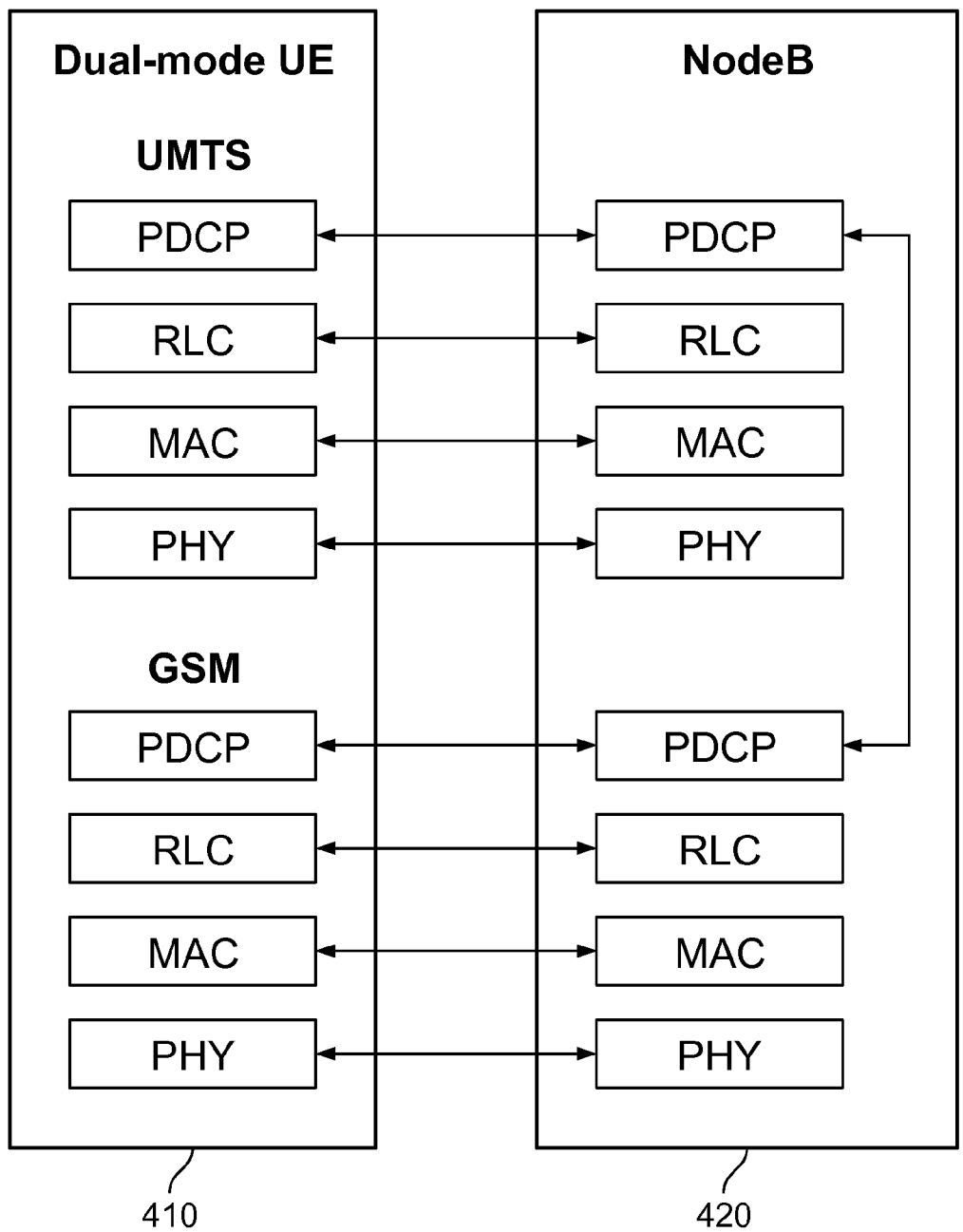
FIG. 4 is a block diagram of the protocol stack of a dual mode GSM and UMTS UE device.
Figure 5:
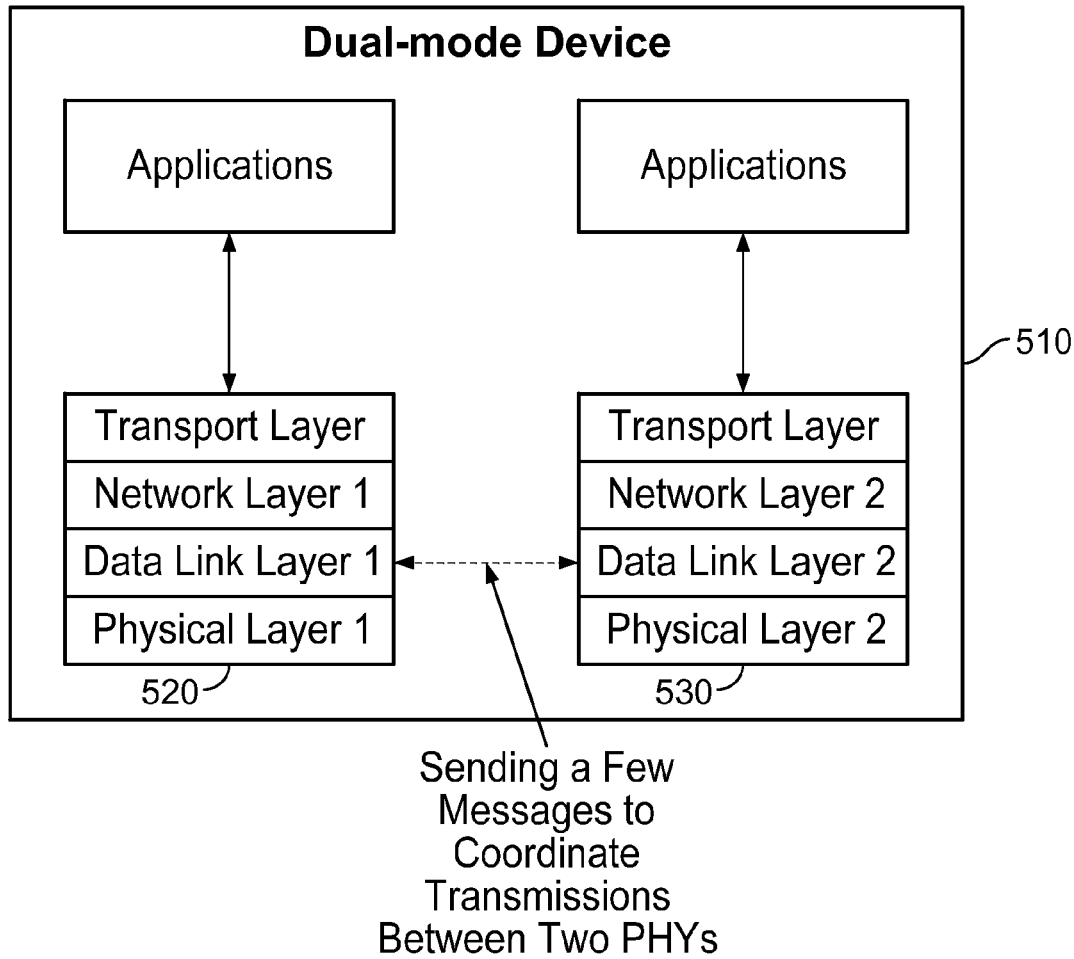
FIG. 5 is a block diagram of the protocol stack of a dual mode device.
Figures 6A, 6B, 6C:
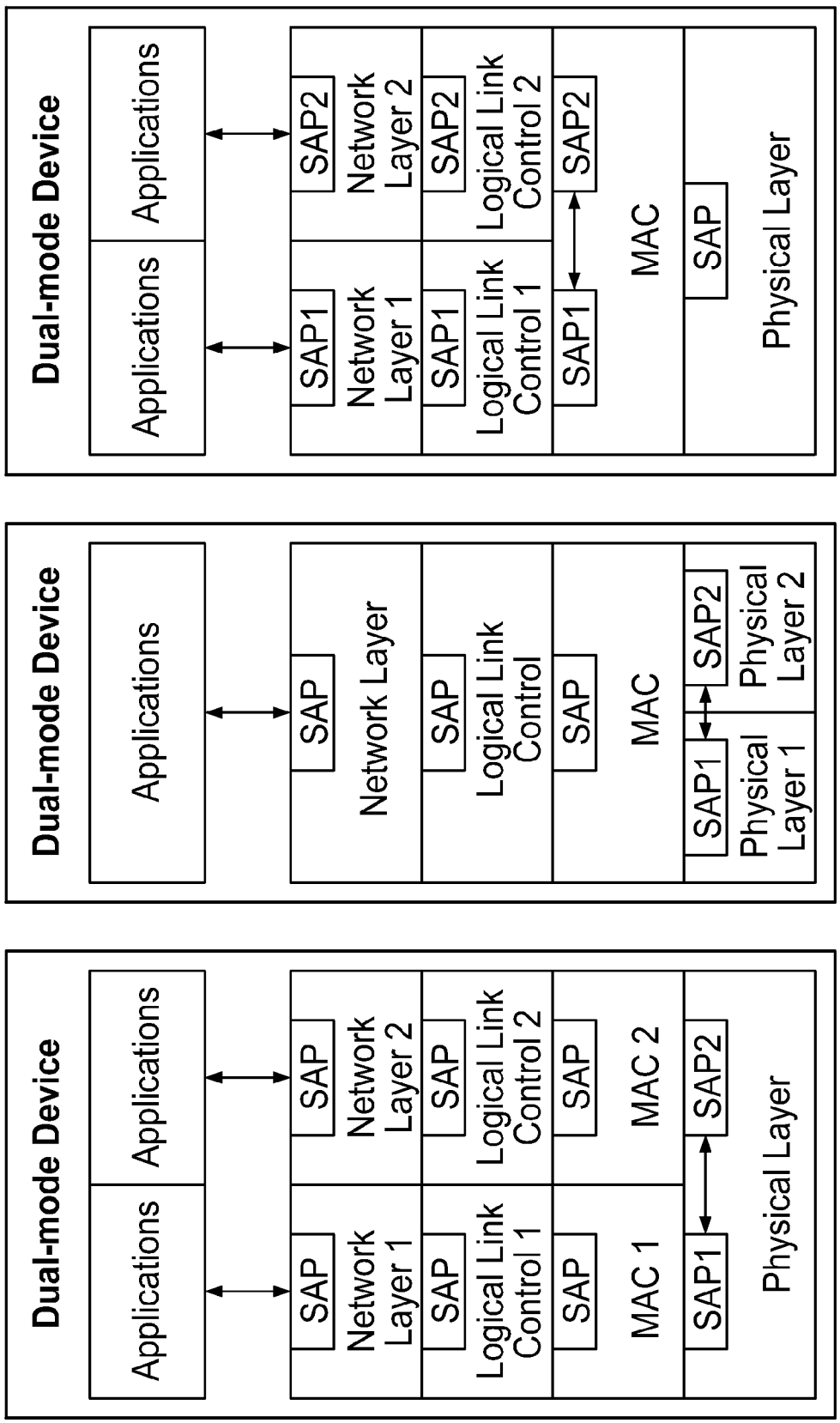
FIGS. 6(a)-(c) are block diagrams of examples of dual mode communication devices with in which protocol layers are not all mapped one to one.

In one embodiment the system and method decouple the PHY, Data Link Layer, Network Layer, and other protocol layers in a communication system so that one layer does not have to be mapped uniquely to another layer in the same system. The protocol layers can also be referred to as modules and in some usage herein the term layer and module is omitted for ease of description. In one example, one PHY can support two or more different data link layers, such as MACs (media access control), via different SAPs. FIG. 6(a) shows the example of a communication device having two network layers and two data link layers (i.e. logical link control sublayer and MAC sub-layer) and a single PHY. The PHY in this example includes a SAP (SAP1 and SAP2) for each MAC (MAC1 and MAC2) the PHY supports. SAP1 and SAP2 coordinate with each other for the available PHY resources to provide PHY services to MAC1 and MAC2 respectively. MAC1 and MAC2 can each implement a different MAC protocol while the PHY can implement a single PHY protocol. The PHY resource coordination between SAP1 and SAP2 includes Protocol Data Unit (PDU) routing, receive and transmit slot allocation, etc. The functionality of PHY resource coordination can be implemented in either SAP1, SAP2 or shared between the SAPs. The introduction of the second SAP and the coordination between SAP1 and SAP2 allow protocol stack 1 (network layer 1, logical link control 1 and MAC1) and protocol stack 2 (network layer 2, logical link control 2 and MAC2) to operate independently and to utilize a single PHY. In one embodiment SAP1 and SAP2 coordinate with each other on the available PHY resource to transmit and receive PDU for both MACs. On PDU transmission, the PHY resource can be provided to the MACs in a round-robin fashion, such that each MAC gets its chance to transmit alternately. The SAPs can also be configured to receive the PHY resource on a first-come-first-serve basis or using another fairness algorithm. On PDU receiving at the PHY, the SAPs have to make sure the PDUs are properly identified and delivered to the intended MACs correctly.

In another example communication device shown in FIG. 6(b), one data link layer can support two physical layers. In this example SAP1 and SAP2 of the two PHYs coordinate with each other to provide physical layer services to the MAC. The network layer and the logical link control layer can operate as if there is just one physical layer. The MAC can access the PHY services via SAP1 and SAP2 in parallel to achieve higher data throughput. Alternatively, the MAC can choose to use the PHY services from one of the two physical layers that provides better quality of service. In one embodiment the PHYs provide measurement reports such as signal to noise ratio, bit error rate and block error rate to the MAC. The MAC derives the QoS from the measurement reports and the MAC layer ACK/NACK. The MAC can then use that information to select a PHY.

FIG. 6(c) shows the example of a communication device with one physical layer, one MAC sub-layer and 2 logical link control sub-layers. The single MAC provides MAC services to logical link control 1 and logical link control 2 via SAP1 and SAP2 respectively. SAP1 and SAP2 coordinate with each other for MAC resources that can be made available to logical link control 1 and logical link control 2. Protocol stack 1 (network layer 1 and logical link 1) and protocol stack 2 (network layer 2 and logical control 2) can operate independently without the knowledge of each other. As should be clear from the foregoing examples, it is possible to have different combinations of numbers of different layers or sub-layers via different SAPs.

Though the description of each of the embodiments of communication devices depicted in the functional block diagrams of FIGS. 6(a)-(c) include specific examples of some layers being a single entity (e.g., one MAC layer in FIGS. 6(b) and (c)) and other layers being two entities (e.g., two network layers in FIG. 6(a)), it should be apparent to those of skill in the art that the invention encompasses various combinations of single entity layers and multiple entity layers (including multiple entity layers with more than two entities (e.g., three four or more MACs) communicating and coordinating with each other according to the principles described herein.

In a further embodiment the PHY, Data Link Layer (DLL), Network Layer, and other protocol layers of a communication device are decoupled so that one layer does not have to mapped uniquely to another layer in the same device. In one example, this is accomplished by using an additional entity management module. In one example, in a single mode device, one layer in the protocol can be mapped to one or multiple other layers in the same protocol. However, by using an additional entity management system or method, the mappings are transparent to each protocol layer. As a result, the operation of this device complies with the operations defined by the standard.

In one example, one DLL (e.g., comprising the logical link control sub layer and media access control sub layer) can be mapped to multiple PHYs. By moving the service access points (or their functionality) to the entity management module, the mappings can be transparent to each protocol layers. For example, each PHY is only aware of one DLL and vise versa. By doing so, the device can behave like a standard compliant device to its own protocol as well as to other communication devices associated with this device. In the meantime, it can achieve objectives such as increasing the data rate. Though the following embodiments described in connection with FIGS. 7 and 8 have specific variations in the number of PHY layers, and data link layers, the invention encompasses other combinations of elements of layers (e.g., one element in each layer, multiple network layers, multiple MAC layers and other combinations) with the functions of the service access points being accomplished by an entity management module according to the principles described herein.

Figure 7:
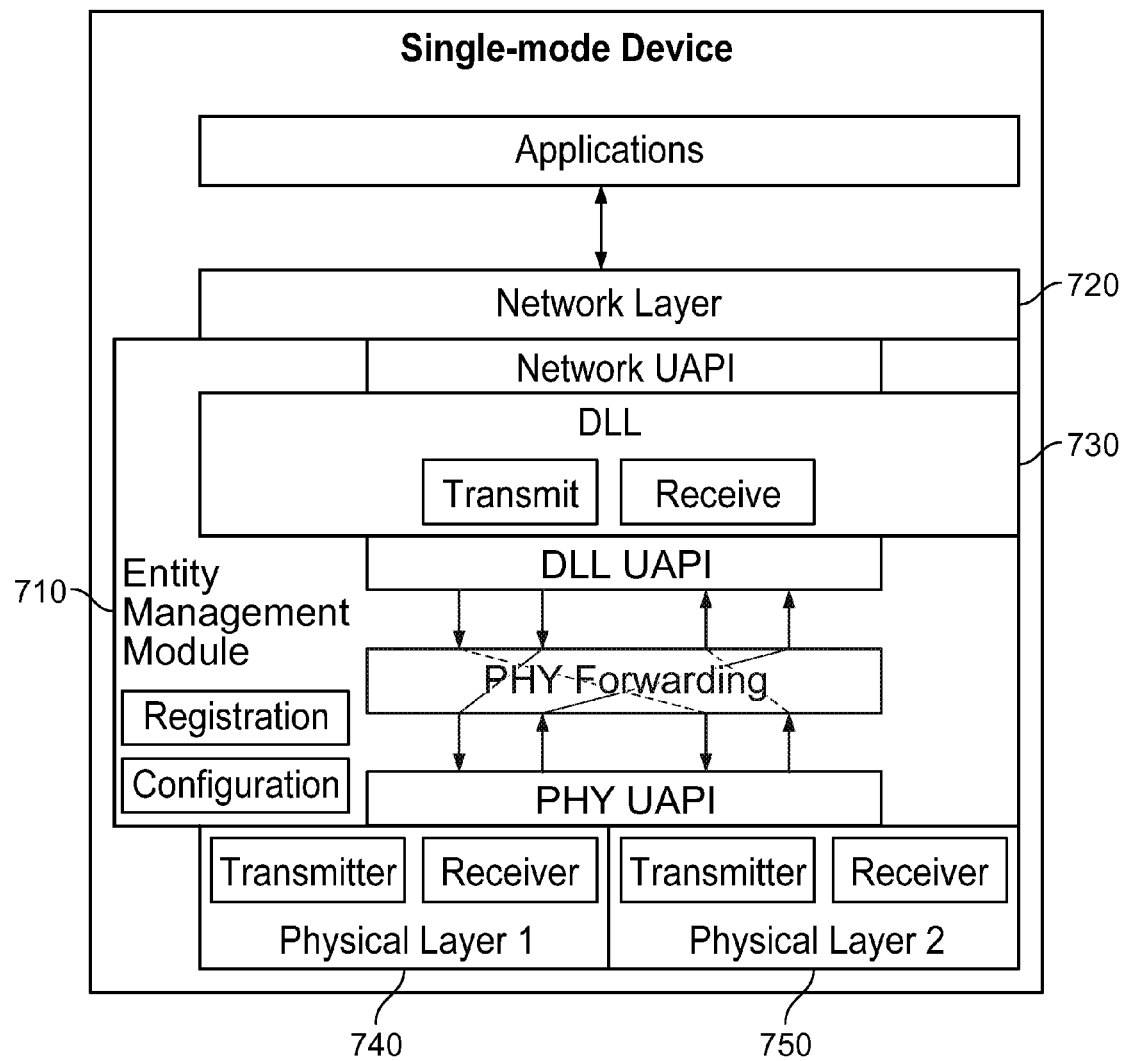
FIG. 7 is a block diagram of the protocol layers of a communication device having two PHYs.

As shown in the communication device depicted in FIG. 7, the entity management module 710 can provide a single service access point (Network SAP) between the network layer 720 and the DLL 730 with a unified application program interface (Network UAPI). In addition, the entity management module provides a single service access point (DLL SAP) between the DLL and the two PHYs 740 and 750 with a unified application program interface (DLL UAPI). In one embodiment the DLL can handle multiple independent I/O ports for the transmission and reception of the network Protocol Data Units (PDUs), such that the entity management module can open and close the DLL I/O ports and map them to the active PHYs of the device. The entity management module can include the following functions to save the DLL from knowing the actual number of PHYs supported by the apparatus and having to manage them.

1. Open DLL I/O ports
2. Close DLL I/O ports
3. Open PHY I/O ports
4. Close PHY I/O ports
5. Open PHY signal ports
6. Close PHY signal ports
7. Request network PDUs for transmission
8. Deliver network PDUs upon reception
9. Request DLL PDUs for transmission
10. Deliver DLL PDUs upon reception
11. Deliver PHY signals to DLL.

The DLL I/O port open function provides the network layer a programming interface to open a DLL I/O port to send and receive network PDUs to and from the DLL. The protocol parameters related to the DLL and network I/O buffer information (e.g. buffer location and buffer size) are passed to the entity management module via the port open programming interface for port mapping (i.e. mapping DLL I/O port to PHY I/O port) and PDU routing. The DLL I/O port close function provides the network layer a programming interface to close a DLL I/O port. Protocol parameters and I/O buffer information associated with the port will be erased as a result of the I/O port close action. The PHY I/O port open function provides the DLL a programming interface to open a PHY I/O port to send and receive DLL PDUs to and from the PHY. The protocol parameters related to PHY and DLL I/O buffer information are passed to the entity management module via the port open programming interface. The entity management module completes the port mapping between the DLL and PHY I/O ports upon the execution of the PHY I/O port open. The PHY I/O port close function provides a programming interface to the DLL to close a PHY I/O port. Protocol parameters and I/O buffer information associated with the port will be erased as a result of the I/O port close action. The PHY signal port open function provides the DLL a programming interface to open a signal port to send configuration signals to PHY and receive status and measurement report from PHY. The PHY signal port close function provides the DLL a programming interface to close a PHY signal port. The network PDU request and DLL PDU request functions are to facilitate the network PDU transmission. The PHY initiates the PDU transmission by requesting DLL PDUs via the entity management module. The request is relayed to the DLL. The DLL sends the PDUs to the PHY via the PHY I/O port in response to the request. In addition, the DLL sends network PDU request via the entity management module. The network layer sends the PDUs to the DLL via the DLL PHY I/O port in response to the request. On PDU receiving, the PHY sends the received PDUs to the DLL via the DLL I/O port. In turn, the DLL send the received the PDUs to the network layer via DLL I/O port.

In one embodiment, the apparatus communicates with its peers (other communication devices) through signaling to determine whether its peers are capable of transmitting and/or receiving data at increased data rates (e.g., using both PHYs). The entity management module can configure the protocol layers (e.g. opening I/O ports) for exchanging data with its peers at increased data rates according to the signaling results. The management module can configure the protocol layers such that the apparatus can exchange data with its peers at increased data rates on the transmit link only, on the receive link only or on both transmit and receive links.

During the network PDU transmission operation, the entity management module requests the amount of network PDUs from the network layer according to the needs of the active PHYs of the apparatus. The entity management module delivers the PDUs to the DLL through the DLL I/O ports. The DLL performs the protocol compliant functions (e.g. multiplexing, ciphering) on each I/O port independently. Upon completion, the DLL delivers the DLL PDUs to the entity management module per DLL I/O port. The entity management module delivers the DLL PDUs to the corresponding PHY I/O ports.

During the reception operation, the PHYs deliver the received DLL PDUs to the entity management module via a predetermined I/O port. The entity management module delivers the DLL PDUs to the DLL through the appropriate DLL I/O port. The entity management module tracks/coordinates the mapping of PDUs to ports and PHY ports to DLL ports. Upon receiving the PDUs, the DLL performs the protocol compliant functions (e.g. de multiplexing, deciphering) on the PDUs of each I/O port independently. Upon completion, the DLL deliver the network PDUs to the entity management module per I/O port. The entity management module delivers the network PDUs to the network layer.

In a multi-mode device, one layer in the protocol can be mapped to one or multiple other layers in the same or different protocols. However, by moving the services access points to the entity management module, the mappings are transparent to each protocol layer. As a result, the operation of this device complies with the operations defined by the standard.

Figure 8:
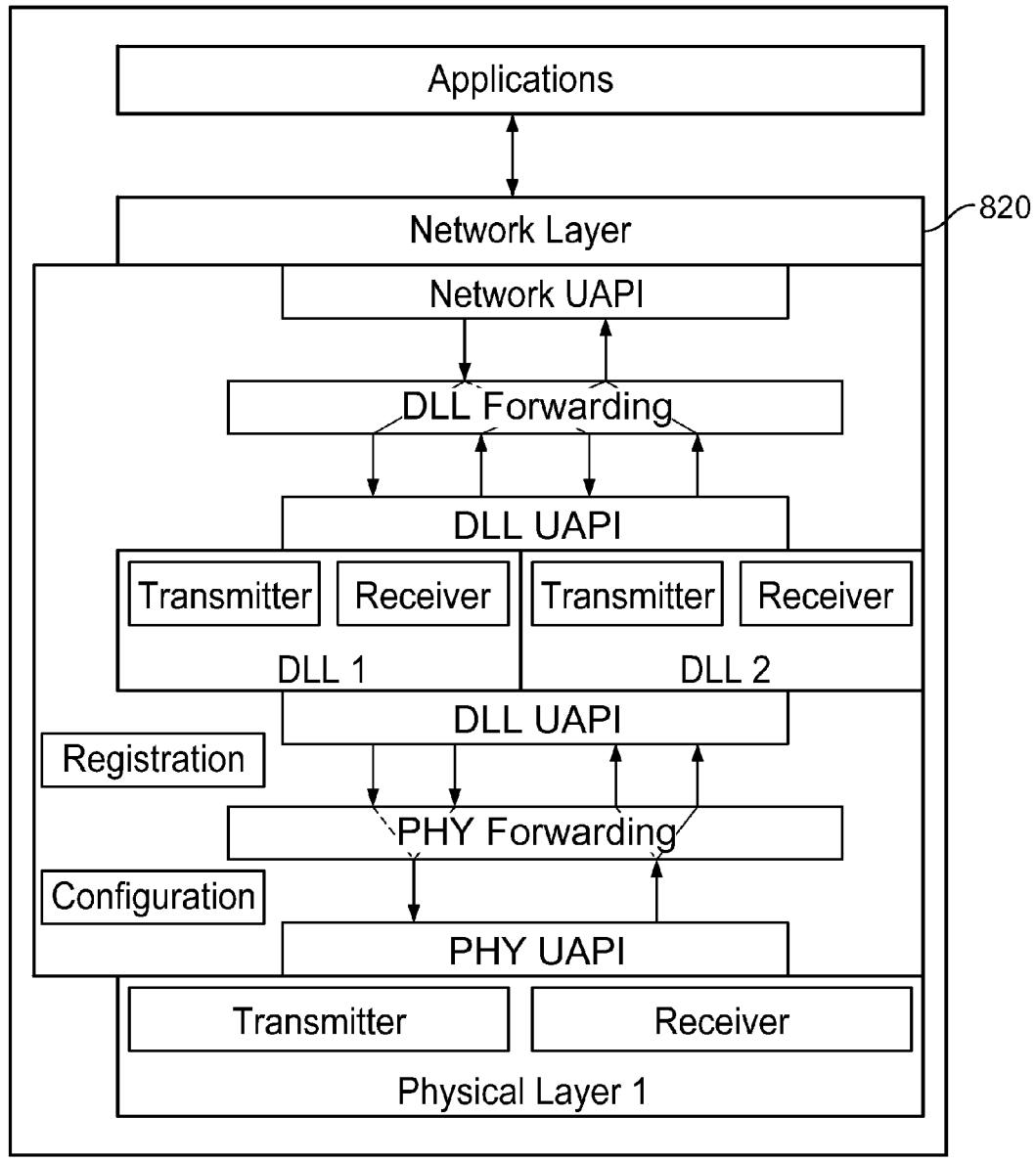
FIG. 8 is a block diagram of a multi-mode device communication device having an entity management module.

In one example communication device shown in FIG. 8, two different DLLs (DLL1 and DLL2) are mapped to one network layer and one PHY. By using an entity management module and method, the mappings are transparent to each protocol layer. In this example the network layer accesses the DLL through a single service access point provided by the entity management module and the PHY still provides a single service access point (not shown). The device can behave in a manner that complies with a standard internally as well as externally to other communication devices associated with this device. In the meantime, it can achieve objectives such as reuse of the PHY for two different standards.

The entity management module can be implemented such that it provides a single access point (Network SAP) between the network layer and the DLLs with a unified application program interface (Network UAPI) and a single service access point (PHY SAP) between the DLLs and the PHY with a unified application program interface (PHY UAPI). The entity management module can include the following functions to save the PHY from knowing that the existence of multiple DLLs and having to manage that complexity.

1. Open DLL I/O ports
2. Close DLL I/O ports
3. Open PHY I/O ports
4. Close PHY I/O ports
5. Open PHY signal ports
6. Close PHY signal ports
7. Request network PDUs for transmission
8. Deliver network PDUs upon reception
9. Request DLL PDUs for transmission
10. Deliver DLL PDUs upon reception
11. Deliver PHY signals to DLL.

In one embodiment, the apparatus communicates with its peers through signaling to determine whether its peers are single mode or multi-mode devices. For example, the entity management module can initiate a device type/category request to its peer. The peer sends device type/category confirmation in response to the request. The entity management module can configure the protocol layers (e.g. opening I/O ports) for exchanging data with its peers according to the signaling results. The entity management module can configure the protocol layers such that the apparatus can exchange data with a single-mode device, a multi-mode device on the transmit link, a multi-mode device on the receive link or a multi-mode device on both transmit and receive links.

During the DLL transmission operation, the entity management module requests network PDUs from network layer request handler. The entity management module delivers the PDUs to the scheduled active DLL through the DLL I/O port previously opened by the entity management module. The DLL performs the protocol compliant functions (e.g. multiplexing ciphering) on the PDUs. Upon completion, the DLL delivers the DLL PDUs to the entity management module through the DLL UAPI. The entity management module delivers the DLL PDUs to the PHY through the PHY I/O ports for transmission.

During the reception operation, the PHY delivers the received DLL PDUs to the entity management module through the PHY UAPI. The entity management module delivers the DLL PDUs to the intended DLL receive handler according to the mapping. Upon receiving the PDUs, the DLL performs the protocol compliant functions (e.g. de multiplexing, de ciphering) on the PDUs. Upon completion, the DLL delivers the network PDUs to the entity management module through the DLL UAPI. The entity management module delivers the network PDUs to the network layer through network receive handler. It is possible to have different combinations of the number of different layers or sub-layers via different SAPs (functionality) provided by the entity management module.

A further embodiment includes an entity management method and system that has the intelligence about the mappings in the entire protocol so that it provides SAPs (functionality) to different protocol layers based on the mappings and makes the none-one-to-one mappings transparent to the protocols involved as well as to other communication devices associated with this device. Such a system and method can comply with the standard defined protocol operations.

An additional embodiment includes an entity management method and system that has the intelligence about the mappings in the entire protocol so that it provides SAPs (functionality) to different protocol layers and makes one protocol behave like more than one device. This can be transparent to the protocols involved as well as to other communication devices associated with this device. The system and method can comply with the standard defined protocol operations.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

We claim:

1. A multiple physical layer communication system comprising:
   a network layer providing a communication interface to at least one application;
   a data link layer in communication with the network layer and transmitting data to and from the network layer and routing said data between adjacent nodes on the network according to a data link layer protocol;
   an entity management module comprising:
   a network unified application program interface (Network UAPI) to provide communication between the network layer and the data link layer,
   a data link layer unified application program interface (DLL UAPI) providing communication between the data link layer and a first physical layer and a second physical layer,
   a physical layer unified application program interface (PHY UAPI) providing communication between the first physical layer and the second physical layer and the data link layer;
   wherein the entity management module is configured to request an amount of network data from the network layer via the Network UAPI for the first physical layer and the second physical layer;
   wherein the entity management module is further configured to deliver data received from the network layer to the data link layer through a plurality of input/output ports of the data link layer;
   wherein the entity management module is further configured to deliver data received from the plurality of input/output ports of the data link layer to the first physical layer and the second physical layer via the DLL UAPI;
   wherein the entity management module is further configured to receive data from the first physical layer and the second physical layer and deliver the received data to the data link layer;
   wherein the entity management module is further configured to deliver data received from the network layer to the data link layer via the Network UAPI;
   wherein the first physical layer is using a different physical layer standard from the second physical layer;
   wherein the data link layer receives the data from the first physical layer and the second physical layer at a same time;
   wherein a number of layers of the data link layer is less than a number of layers of the first and the second physical layers;
   wherein maximum data throughput of the network layer is greater than maximum data throughput of each of the first physical layer or the second physical layer; and
   wherein the entity management module is further configured to open and close the plurality of input/output ports of the data link layer and map the plurality of input/output ports to the first physical layer and the second physical layer.

2. The multiple physical layer communication system of claim 1, wherein the first physical layer and the second physical layer initiate data transmission by sending a request to the data link layer.

3. The multiple physical layer communication system of claim 1, wherein during transmission, the entity management module performs a protocol compliant function on each input/output port independently, the protocol compliant function being multiplexing or ciphering.

4. A multiple data link layer communication system comprising:
   a network layer providing a communication interface to at least one application;
   a first data link layer in communication with the network layer and transmitting data to and from the network layer and routing said data between adjacent nodes on the network according to a first data link layer protocol;
   a second data link layer in communication with the network layer and transmitting data to and from the network layer and routing said data between adjacent nodes on the network according to a second data link layer protocol;
   an entity management module, wherein the entity module comprises:
   a network unified application program interface (Network UAPI) to provide communication between the network layer and the first data link layer via a data link layer unified application program interface (DLL UAPI) and to provide communication between the network layer and the second data link layer via the DLL UAPI;
   the data link layer unified application program interface (DLL UAPI) to provide communication between the network layer via the Network UAPI and the first data link layer and the second data link layer and to provide communication between the first data link layer and the second data link layer and the physical layer via a physical layer unified application program interface (PHY UAPI); and
   the physical layer unified application program interface (PHY UAPI) providing communication between the first data link layer and a physical layer and the second data link layer and the physical layer via the DLL UAPI,
   wherein the entity management module is configured to determine, for a first set of data received from the network layer, which data link layer to deliver the first set of data to;
   wherein the entity management module is further configured to deliver data received from the first data link layer and the second data link layer to the physical layer via the PHY UAPI;
   wherein the entity management module is further configured to determine, for a second set of data received from the physical layer, which data link layer to deliver the second set of data to;
   wherein the first data link layer protocol is different from the second data link layer protocol;
   wherein a number of layers of the physical layer is less than a number of layers of the first and the second data link layers;
   wherein maximum data throughput of the physical layer is greater than maximum data throughput of the first data link layer or the second data link layer; and
   wherein the entity management module is further configured to deliver the data received from the first data link layer and the second data link layer to the physical layer via a protocol compliant function, the protocol compliant function being multiplexing or ciphering.

5. The multiple data link layer communication system of claim 4, wherein during reception, the physical layer delivers received data to the entity management module via the PHY UAPI.

6. The multiple data link layer communication system of claim 4, wherein the entity management module is further configured to deliver the data received from the physical layer to the first data link layer and the second data link layer via another protocol compliant function, the other protocol compliant function being demultiplexing or deciphering.

* * * * *